(12) United States Patent
Nikolovski

(10) Patent No.: US 6,269,700 B1
(45) Date of Patent: Aug. 7, 2001

(54) CONTACTLESS ULTRASONIC DEVICE FOR DIMENSIONAL INSPECTION

(76) Inventor: Jean-Pierre Nikolovski, 12-14, rue Piccini - 75116, Paris (FR)

( * ) Notice: Subject to any disclaimer, the term of this patent is extended or adjusted under 35 U.S.C. 154(b) by 0 days.

(21) Appl. No.: 09/297,429

(22) PCT Filed: Oct. 28, 1997

(86) PCT No.: PCT/FR97/01934

§ 371 Date: Apr. 28, 1999

§ 102(e) Date: Apr. 28, 1999

(87) PCT Pub. No.: WO98/19133

PCT Pub. Date: May 7, 1998

(30) Foreign Application Priority Data

Oct. 28, 1996 (FR) .................................................. 96 13107

(51) Int. Cl.⁷ ............................ G01N 29/24; G01B 17/00
(52) U.S. Cl. ................. 73/642; 73/597; 374/119
(58) Field of Search .............................. 73/632, 642, 644, 73/597; 374/119; 310/334, 335, 336

(56) References Cited

U.S. PATENT DOCUMENTS 4,281,407 * 7/1981 Tosima .................................. 310/334
4,594,897 * 6/1986 Bantz ..................................... 73/644

FOREIGN PATENT DOCUMENTS 0045456 7/1981 (EP) .
WO96 11378 4/1996 (WO) .

OTHER PUBLICATIONS

*RCA Review*, vol. 44, No. 3. Sep. 1983, pp. 430–464, "Surface acoustic wave stylus: Part I–Pickup and recording devices," S. Toshima et al.

IEICE Transactions on Fundamentals of Electronics, Communications and Computer Science, vol. 76A, No. 10, Oct. 1993, "A Noncontact Thickness Measurement of Thin Samples Using 40 kHz Ultrasonic Wave", K. Imano et al., pp. 1861–1862.

Patent Abstracts of Japan, vol. 009, No. 292 Nov. 19, 1985.

* cited by examiner

*Primary Examiner*—John E. Chapman
(74) *Attorney, Agent, or Firm*—Blakely Sokoloff Taylor & Zafman

(57) ABSTRACT

An acoustic detector which includes at least one emitter unit with a solid tapered profile spike (C) associated with an element (X) for exciting the spike so as to propagate ultrasound waves in an antisymmetrical propagation mode in the spike. The device also emits waves into a surrounding gas. At least one receive unit includes a tapered profile solid spike associated with the detector for receiving the ultrasound waves.

19 Claims, 7 Drawing Sheets

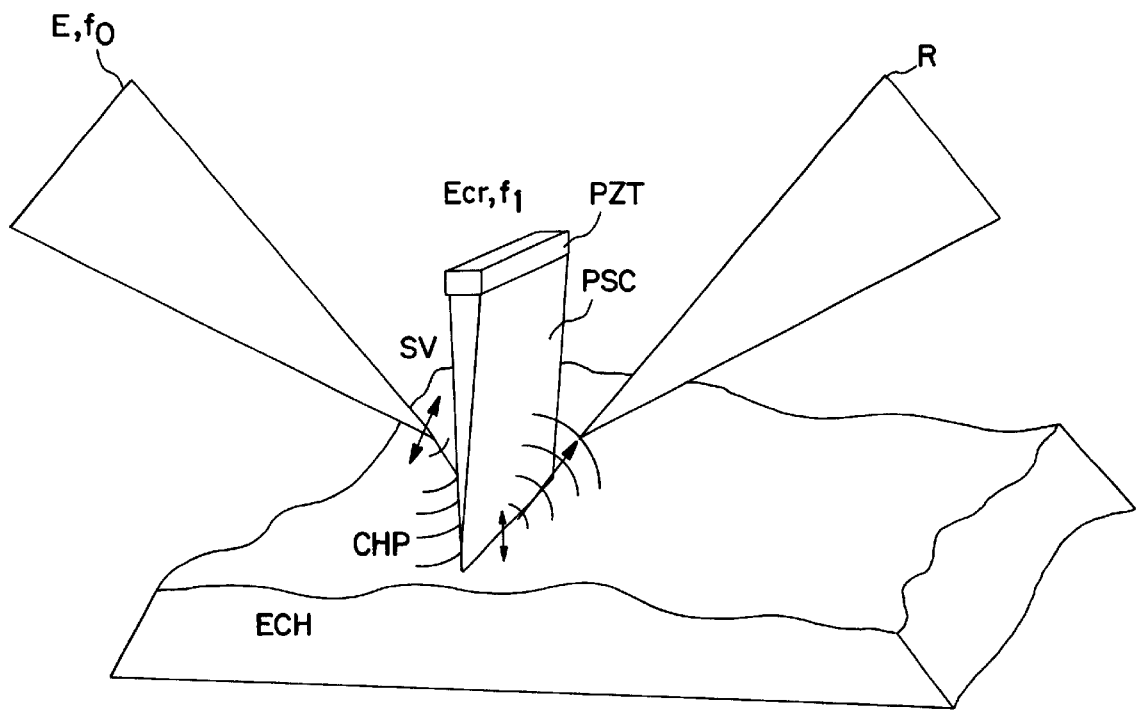
FIG. II
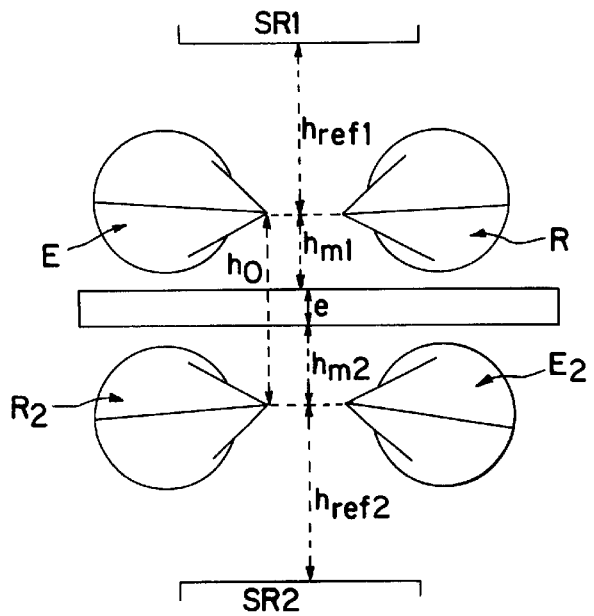
FIG. I2

CONTACTLESS ULTRASONIC DEVICE FOR DIMENSIONAL INSPECTION

Industry requires contactless dimensional inspection tools for measuring profiles complementing available mechanical and optical tools. When measuring profiles, the surface to be inspected is not always highly optically reflective and the roughness to be measured and the area over which the measurement is to be effected are not always suited to an optical technique. It is not always possible to bring a sample into mechanical contact with a micrometric feeler, simply because the structure to be inspected is too fragile to withstand the stress applied by the feeler.

The present invention proposes contactless means of access to dimensional inspection and even measurement of roughness of optical grade surfaces of widely varying mechanical impedance.

Figure 1:
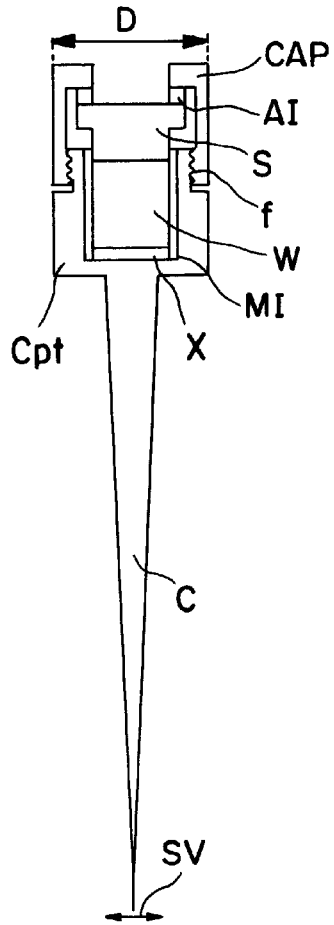

The invention therefore concerns a contactless device for measuring the distance between a surface of a read head consisting of one or more emitters and one or more receivers consisting of electromechanical transducers X coupled to mechanical amplifiers C (FIG. 1). The probed object ECH (FIG. 3) has a different mechanical impedance than the medium in which ultrasound waves generated in the read head propagate. In the present invention, the propagation medium between the probed object and the read head is the air of the atmosphere, but any other gaseous medium could be suitable. The mechanical amplifiers are solid spikes, generally with a conical profile and with a bandwidth adapted to amplify impulse or harmonic ultrasound motion in an antisymmetrical guided mode, for example a bending mode, i.e. a mode whose component of displacement orthogonal to the axis of cylindrical symmetry of the cone is antisymmetrical to that axis. The use of an antisymmetrical mode coupled to a focussing spike has the unique advantage of generating with sufficient localized directional intensity an ultrasound field CHP (FIG. 2) directed toward the object to be probed. Measuring the flight time in an impulse mode or the amplitude and phase of the echo reflected from the probed surface in a harmonic mode measures the distance between a surface element SS (FIG. 8) of the probed object and the end of the focussing spike.

Figure 2:
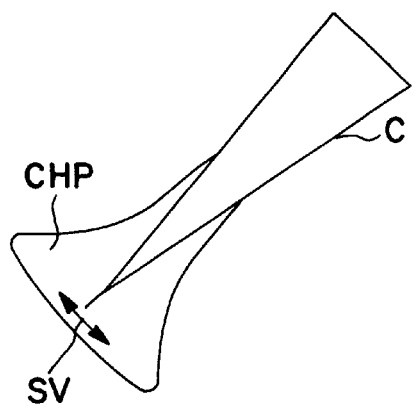
Figure 3:
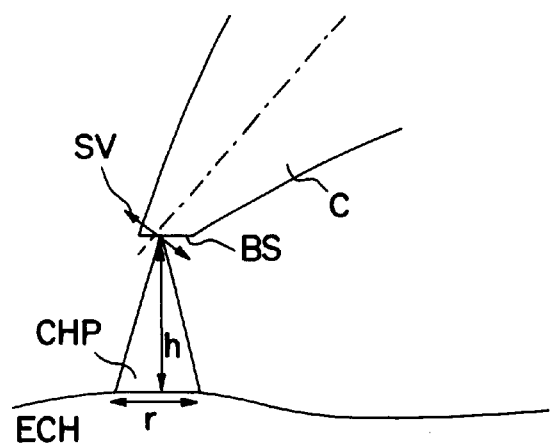
Figure 4:
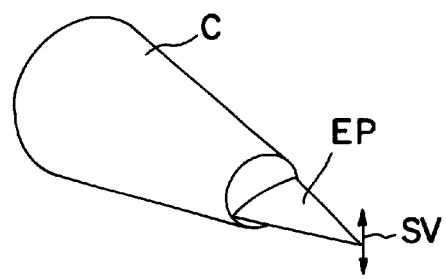
Figure 5:
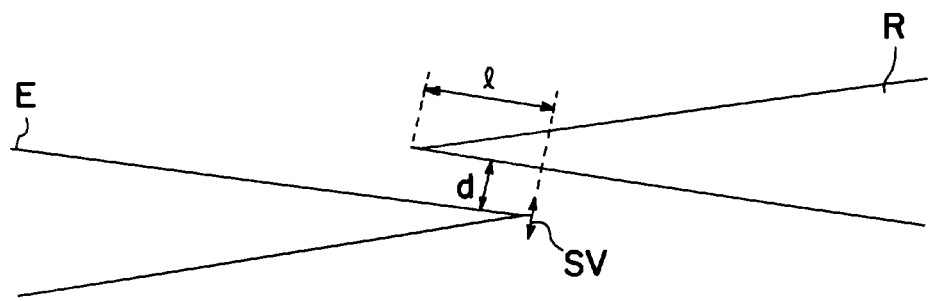
Figure 6:
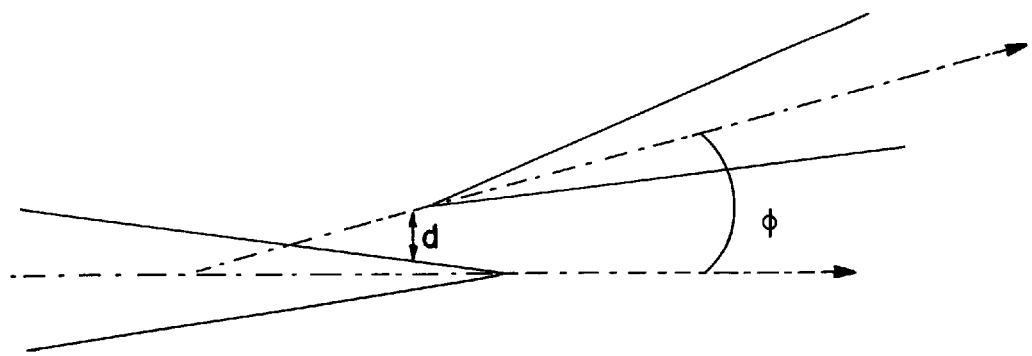
Figure 7:
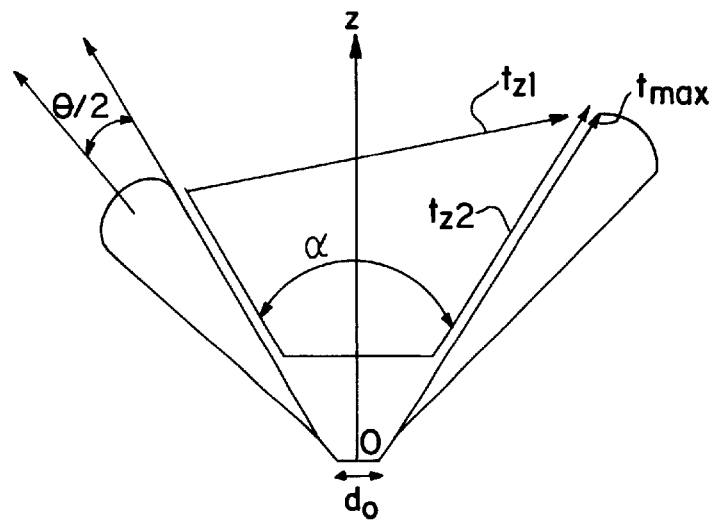
Figure 8:
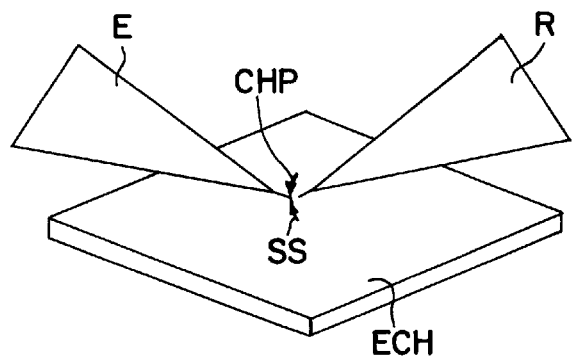
Figure 9:
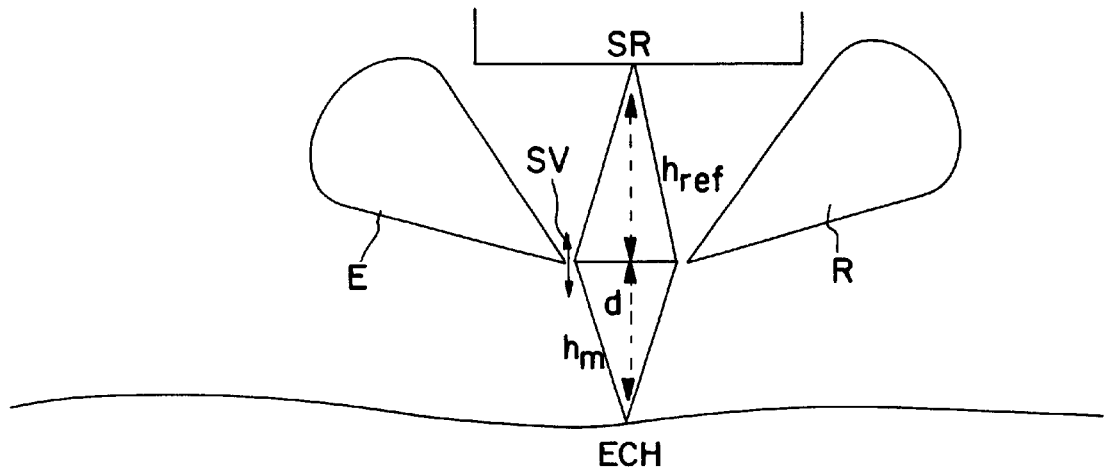
Figure 10:
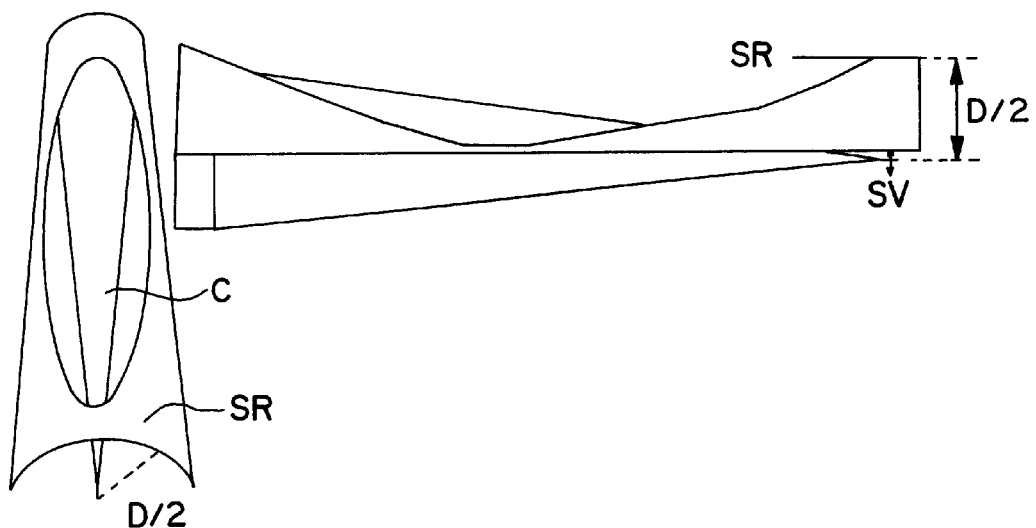
Figure 13:
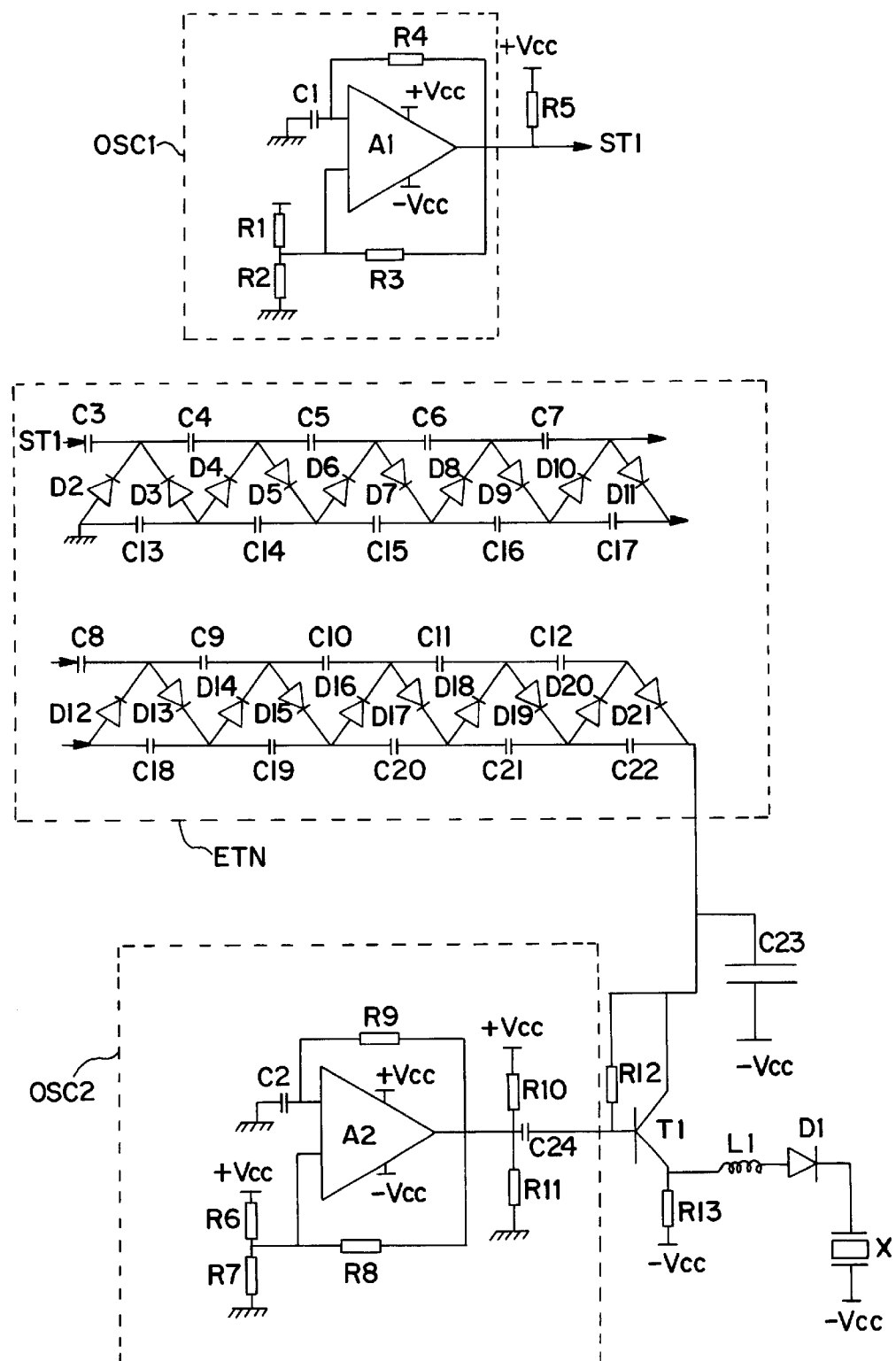
Figure 14:
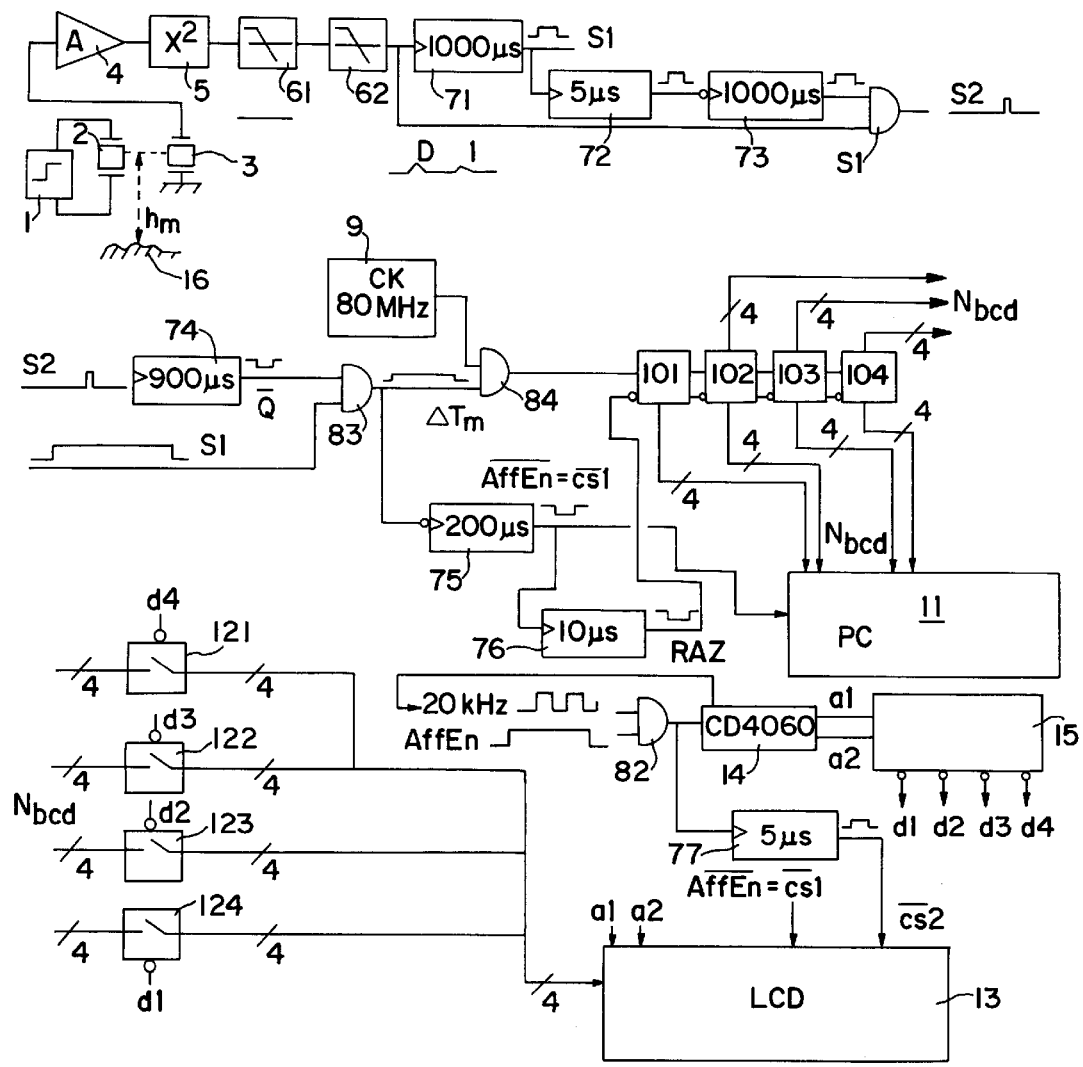

Other aspects, aims and advantages of the present invention will become more apparent on reading the following detailed description of preferred embodiments of the invention given by way of non-limiting example with reference to the accompanying drawings, in which:

FIG. 1 is a diagram showing in axial section a spike C coupled to a piezoelectric element X in a cylindrical compartment Cpt, the compartment and the spike being machined from the same metal rod to optimize the transfer of mechanical stress between the piezoelectric element X and the spike C, FIG. 2 is a qualitative representation of the emission and reception directionality diagram of the ultrasound field CHP generated in air by the system from FIG. 1 when the end of the spike vibrates in a direction SV, FIG. 3 is a diagram showing means for locally modifying the direction of maximum emission of a system identical to that shown in FIG. 1 by machining the end of the cone with a bevel, FIG. 4 is a diagrammatic representation of an embodiment in which the directionality of an emitter-receiver system is increased by polishing the end of the spike, FIG. 5 is a diagrammatic view in axial section showing maximum directional coupling between two systems identical to that shown in FIG. 1, one of which is an emitter E and the other of which is a receiver R, FIG. 6 is a diagrammatic view in axial section showing localized direct coupling between two systems identical to that shown in FIG. 1, FIG. 7 is a diagrammatic view in axial section showing inside generatrices of conical spikes defining an acute angle α on which depends the position of the direct coupling area between the spikes corresponding to the shortest acoustic path linking the bases of the spikes, FIG. 8 shows a configuration with two opposed spikes for detecting the presence of a surface with small dimensions by indirect coupling between the two spikes, FIG. 9 is a diagram showing the general principle of measuring the distance between a read head and the surface of a sample independently of the nature and temperature of the surrounding gas, FIG. 10 is a diagrammatic perspective view of simple means for obtaining a curved reference surface with the end of the associated radius of curvature on the axis of cylindrical symmetry of the tapered spike, FIG. 11 is a diagrammatic representation of a profile measuring device operating in a sinusoidal mode and using a method of disturbing the coupling field between the spikes and the probed surface by means of a vertical screen interleaved between the two spikes whose distance from the probed surface is modulated, FIG. 12 is a diagrammatic representation of a system with two read heads for contactless measurement of the thickness of an object, FIG. 13 is a wiring diagram of the electrical generator for exciting the emitter transducer, and FIG. 14 is a block diagram of a contactless position detector system in accordance with the invention.

Identical and similar items in more than one figure are, as far as possible, identified by the same reference symbols.

A packet of ultrasound waves propagating in an asymmetrical propagation mode relative to the axis of cylindrical symmetry of a tapered solid spike C (typically a bending mode) is generated in the spike. An alternating polarization ferroelectric ceramic bonded to the plane base of the cone is used for this purpose, for example Jean-Pierre-Nikolowski, "lamb wave detector of the position of a stylus", doctoral thesis, Pierre and Marie Curie University, Feb. 2, 1995. The half-angle at the apex of the spike is chosen to provide sufficient bandwidth so that the packet of waves concentrated at the end of the cone has little, if any, deformation. At this end, the material displacement vector has a rectilinear polarization SV perpendicular to the straight line segment delimiting the alternating polarization of the ceramic bonded to the plane base of the cone.

If the solid material of the cone is characterized by a low mechanical attenuation and has a relatively low acoustic impedance, a non-negligible part of the mechanical vibration propagating in the spike is transmitted into the air.

The inventive aspect of the above system lies, on the one hand, in the focussing effect of the low-dispersion tapered profile of the spike, on the other hand, in the use of a transverse wave to generate a radiated beam in air that is directional and intense in the vicinity of the spike, as shown in FIG. 2, and, finally, in the arrangement of the piezoelectric element X and the focussing spike which make the assembly strong at the base of the spike and assures optimum transfer of the stress generated by the piezoelectric element X into the focussing spike. FIG. 1 shows how optimum transfer of stress into the conical spike C is achieved when the spike and the compartment Cpt containing the piezoelectric element X are machined or cast in one piece. The resonance of the piezoelectric element X inserted into the insulative tube MI and bonded to the plane base of the spike is strongly attenuated by the absorbant W. The absorbant is confined in the compartment Cpt by the stopper S, the insulative ring AI and the threaded cap CAP. The bending mode that propagates in the spike is generated either by the piezoelectric element, which naturally resonates in shear in the direction of its thickness, such as a section X or Y+163° of a lithium niobate crystal, or by conversion of a longitudinal wave into a transverse wave.

There is then at the end of the spike C a localized ultrasound source generating in the air an acoustic field CHP which can be used to measure the roughness of a solid surface or to probe a material having a very low acoustic impedance. Given the very low acoustic impedance of air compared to any solid material, it is difficult to probe a solid material in depth using ultrasound propagating in air. On the other hand, ultrasound propagating in air can be used to probe in depth very porous surfaces such as bacterial veils which is an example of a fragile structure according to the teachings of the present invention which allows ultrasonic inspection without physical contact, which is not possible with a micromechanical feeler or using an optical technique.

The echo returned by the material is picked up either by the same probe or by another identical probe R. Using a second probe has a number of advantages. For example, it has the advantages of not disturbing echos in the emitter spike and of being able to detect in a preferential direction determined by the angular sensitivity of the receiving spike of the receiver piezoelectric element. If the second probe picks up the echo returned by the material, the coupling between the two probes is said to be indirect. There is also direct coupling between the two probes, however, and this depends on the orientation of one probe relative to the other one. This direct coupling is obtained when the direction SV of mechanical vibration at the end of a spike is parallel to the direction of the maximum sensitivity of the transducer of the receiving spike. If the spikes are opposite each other at their apex, direct coupling depends on the angle $\phi$ between the points (see FIG. 6) and on the coupling length l and the distance d between the spikes. Optimum contactless coupling is obtained when the axes are parallel, the distance d between the spikes is a minimum distance, without the spikes touching, and the coupling length l is approximately one wavelength (FIG. 5). Beyond this coupling length, a pulse transmitted into the receiver cone is split into two pulses because of reflection at the end of the receiver cone. If the generatrices of the spikes define an acute angle $\alpha$ (FIG. 7), there is a particular value of $\alpha$ such that the shortest flight time enabling a packet of waves to travel from the base of the emitter cone to the base of the receiver cone corresponds to an acoustic path necessarily passing through the ends of the spikes.

If oz denotes the axis defined by the bisector of the axes of the two cones (FIG. 7), $d_0$, the distance between the ends of the cones, $C_{air}$ the speed of the waves in air, $C_{dur}$ the speed of the transverse mode in the Duralumin spike, $\theta$ the angle at the apex of the two identical cones, $\alpha$ the angle between the inside generatrices of the two cones, $t_{zi}$ (with i=1 or 2) the flight time of a packet of waves joining the two bases and passing through the abscissae $z_i$ (i=1 or 2) and $t_{max}$ the flight time of a packet of waves joining the two bases and passing through the ends, when the condition $t_{max} < t_z$ implies the condition $$\alpha > 2 \cdot \arcsin\left(\frac{C_{air}}{C_{dur}}\right).$$

At 20° C., the limit angle $\alpha$ for which $t_{max} = t_z$ is 12.6°. The signal at the terminals of the receiver transducer is at a maximum for this limit angle $\alpha$.

For the condition $t_{max} < t_z$ to be satisfied over all the operating temperature range of the device, it is sufficient for $\alpha$ to be greater than the limit value of $\alpha$ corresponding to the highest working temperature in air.

Accordingly, direct coupling can be used to generate ultrasound efficiently and without contact in a solid medium which can be moving relative to the emitter. Direct coupling can also be used to detect the presence of an object between the spikes. An important application of optimum direct coupling concerns acoustic thermometry. With an emitter-receiver system similar to that shown in FIG. 5, combined with polishing the spikes to obtain a plane end (see FIG. 4) increasing the facing surface area between the two spikes, an acoustic interferometer of small dimensions that can be used for thermometry is obtained. The facing surfaces at the ends of the spikes constitute a small resonant cavity whose resonant frequency depends on the temperature of the gas between the facing surfaces. To find the fundamental or harmonic resonant frequencies of the cavity it is sufficient to excite one of the two transducers using a sinusoidal voltage whose frequency is varied and to monitor the amplitude and phase of the signal a the terminals of the receiver transducer. At the fundamental resonance, the distance d between the two spikes is equal to half the wavelength of longitudinal waves in the gas. For an nth order harmonic resonance the following equations apply:

$$\lambda = \frac{2d}{n} \quad (1)$$

$$c = \lambda f = \frac{2df}{n}$$

where $\lambda$ is the wavelength in the gas, f is the resonant frequency, d is the distance between the spikes, c is the speed of the longitudinal waves in the gas and n is the order of the resonant frequency. If the gas in the cavity is deemed to be a perfect gas, the temperature of the gas can be deduced from the following equation M. Zemansky, R. H. Dittman, "Heat and thermodynamics", Sixth Edition, McGraw-Hill international book company, 1981:

$$T = \frac{c_0^2 M}{\gamma R} \quad (2)$$

where M is the molecular weight of the gas (M=28.96 kg/kmol for air), $c_0$ is the speed of the longitudinal waves at the extrapolated temperature T at zero pressure to maintain perfect gas conditions, $\gamma$ is the ratio of the specific heats of the gas ($\alpha$=1.4 at 273 K for air) and R is the perfect gas constant (R=8.314 kJ/kmol·K).

Combining equations (1) and (2), the temperature of the gas is given by equation (3):

$$T = \frac{4d^2 M}{n^2 \gamma R} f^2 \quad (3)$$

For example, for a distance d of 331 $\mu$m, the fundamental (n=1) resonant frequency of the cavity at 273 K is 500 kHz.

If the axes are at a non-zero angle φ, the coupling area is localized at the end of the emitter spike in FIG. 6.

Minimum coupling is obtained if, starting from maximum direct coupling, one of the two spikes (or better still both of them) is rotated π/2 about its axis.

In the case of minimum direct coupling between the two spikes (the direction SV of maximum emission from the emitter transducer being parallel to the direction of maximum sensitivity of the receiver, indirect coupling is obtained if the field emitted by the emitter E is picked up by the receiver R after reflection from a surface element SS of a nearby sample ECH (FIG. 8).

This technique can be used to implement a position detector.

The wavelength of the waves in air at 1 MHz is 331 μm at 273 K. Using electronics for detecting the packet of waves based on detecting the energy of the packet of waves, i.e. based on detecting the squared value of the amplified signal, or (if the waveform is fixed as it is here for direct coupling) based on simply triggering a comparator, it is possible to achieve a resolution in terms of the arrival time of the packet of waves equal to a fraction of the pseudo-period of the packet of waves.

The vertical resolution of a position detector comprising a system of two spikes can be in the order of one micrometer. The lateral resolution depends on the inclination of the axes of symmetry of the spikes relative to the probed surface and the size and radius of curvature of the ends of the spikes. It is in the order of a few tens to a few hundreds of micrometers.

The emit or receive directionality of a spike can be greatly increased by polishing its end to produce a locally plane surface EP (FIG. 4).

A preferred aspect of the invention is to operate the system in a pulse mode. Obviously it is equally possible to operate the system in a sinusoidal mode. This mode of operation produces signal gain, in particular if the operating frequency is a fundamental or harmonic mechanical resonant frequency of the emitter E and/or the receiver R.

The emitter and the receiver comprise a focussing spike C coupled to an electromechanical source and the resonant frequencies are determined, on the one hand, by the dimensions of the spike and the speed of the ultrasound waves in the spike and, on the other hand, by the coupling of the spike to the electromechanical source X bonded to the base of the spike. The electromechanical source can fix the operating frequency if the mechanical resonance of the element constituting it is exploited. To improve the amplitude of the output signal it is of course preferable for the emitter and the receiver to have exactly the same resonant frequency. In a sinusoidal mode, the bandwidth of the spike is not crucial and a geometrical shape other than a conical shape can be chosen. In a sinusoidal mode there is no question of accurately measuring the propagation time of the ultrasound wave, but only variation in amplitude and phase of the signal at the terminals of the receiver relative to the excitation signal when a sample is moved up to a read head or a sample is slid under it.

There are various methods for measuring a profile. One consists in mechanically slaving the read head at a constant distance from the profile and recording the electrical control signal as a function of position. Another moves the two spikes in a plane and observes the variations in the flight time of the packet of waves. In the latter case the accuracy of the measurement is more random if the profile of the surface varies rapidly in spatial terms because the lateral resolution of the system depends on the distance between the spike and the sample.

For a distance h between the spike and the sample (see FIG. 3), the radius r in the area of coupling with the probed surface is determined by the time period dt between the reference time of arrival of the packet of waves determined by the detection electronics and the time of arrival of the head of the packet, as well as on the speed $c_l$ of the longitudinal waves in air, from the equation $r = \sqrt{c_l^2 \cdot dt^2 + 2 \cdot d t \cdot c_l \cdot h}$. Accordingly, for a period dt of 1 μs, a spike-sample distance h of 2 mm and a speed of 331 m/s, the radius of the interaction area contributing to the waveform at the time of the measurement is 1.2 mm. To prevent the relatively long spike taking up too much room on the probed surface, it can be beneficial to cut it to a bevel BS (FIG. 3). It can then be straightened slightly whilst maintaining a maximum sensitivity direction perpendicular to the surface of the sample.

In a sinusoidal mode, the radius of the area of coupling with the probed surface cannot maintain the lateral resolution of the impulse mode. To improve the lateral resolution the coupling field CHP between the two spikes and the probed surface can be disturbed using a screen Ecr whose position is modulated vertically at a frequency $f_1$ sufficiently far from the excitation frequency $f_0$ of the emitter spike, as shown in FIG. 11. Synchronous detection of the field disturbed at the frequency $f_1$ then retains only the information on the profile of the object in the immediate vicinity of the screen. The resolution obtained for the profile depends on the thinness of the screen in the vicinity of the surface of the probed object. The screen can be a glass plate PSC, for example, with a razor blade fixed to its end. The razor blade is moved vertically by exciting the first symmetrical Lamb mode $S_0$ in the plate using a ceramic rod PZT glued to the edge of the plate and excited at the frequency $f_1$ of longitudinal resonance of the plate.

In a pulse mode, the fact that the speed of sound is temperature dependent is inconvenient. From equation (2):

$$c = \sqrt{\frac{\gamma R T}{M}} \quad \text{and} \quad \frac{\Delta c}{c} = \frac{1}{2} \frac{\Delta T}{T} \qquad (4)$$

if the distance $h_m$ between the ends of the spikes and the probed surface is large relative to the distance d between the emitter E and the receiver R of a reading system with two spikes, as in FIG. 3, the round trip flight time $t_{gm}$ of a wave between the read head and the probed surface is approximately $$t_{gm} = \frac{2 h_m}{c}.$$

The relative variation in this flight time is easily related to the relative variation in temperature. The relative variation in the measurement $\Delta h_m / h_m$ is then deduced from the relative variation in the temperature $\Delta T/T$:

$$\frac{\Delta t_{gm}}{t_{gm}} = -\frac{\Delta c}{c} = -\frac{1}{2} \frac{\Delta T}{T} \Rightarrow \frac{\Delta h_m}{h_m} = -\frac{1}{2} \frac{\Delta T}{T} \qquad (5)$$

where c is the speed of the waves in the gas and T is the temperature of the gas. If the read head is 0.6 mm from the surface, a temperature increase of +3° C. reduces the measured value of the height $h_m$ by 3 μm. Still with $h_m$=0.6 mm, with a distance d of 50 μm between the ends of the spikes the measured value of $h_m$ is 1 μm too high.

To measure $h_m$ over a time period and with micrometric accuracy, it is necessary to correct the temperature drift of the system. This can be achieved in pulse mode, given that a vibrating spike emits in both directions, i.e. not only toward the probed surface but also in the direction away from the probed surface. It is then sufficient to place at a reference distance $h_{ref}$ a reflective surface SR giving an echo after a total flight time $t_{ref}$. An ingenious way of amplifying the echo returned by the reference surface is to use a reference curved surface whose radius of curvature is centered at the end of the receiver spike. The curved surface can be a portion of a hollow tube or sphere. The important point here is the difficulty of having the axis of cylindrical symmetry of the tube or the center of the sphere coincide with the end of the spike. FIG. 10 shows one way to solve this problem: the reference curved surface is a portion of a tube subtending an angle much less than 180° in order not to prevent the spikes being moved close together. The tube portion is cut from a tube having an inside diameter D equal to the outside diameter of the cylindrical compartment Cpt housing the piezoelectric element X (see FIG. 1). One side of the tube portion is fixed to the cylindrical base of the receiver probe, as in FIG. 1. This greatly facilitates achieving coincidence of the axis of the tube portion and the axis of the spike. The drawback of this arrangement is that the reference distance $h_{ref}$ equal to D/2 at the end of the spike decreases on moving up the axis from the receiver point. This problem is eliminated by creating an oblong hole in the tube portion in the angular sector corresponding to the maximum sensitivity of the receiver.

A total flight time of a packet of waves from the base of an emitter probe divides into a flight time $t_1$ associated with the flight time in the first spike accumulated with a flight time $t_2$ in the second spike accumulated with a flight time $t_{gm}$ in the gas toward the sample (and $t_{gr}$ in the gas toward the reference plane). The flight times $t_m$ and $t_{ref}$ are expressed by the equations:

$$t_m = t_1 + t_2 + t_{gm} = t_1 + t_2 + \frac{2h_m}{c} \quad (6)$$

$$t_{ref} = t_1 + t_2 + t_{gr} = t_1 + t_2 + \frac{2h_{ref}}{c}$$

In the case of measuring the position hm, the distance d between the two spikes is made as small as possible. In practice it is relatively simple for this distance to be as small as one micrometer with the result that a total flight time, whether it is a reference time or a measurement time, divides into a flight time $t_1+t_2$ in the spikes by direct coupling and a flight time $t_{gm}$ or $t_{gr}$ by indirect coupling depending on whether it relates to the reference surface or the measurement surface. If the time origin is the time of arrival of the packet of waves due to direct coupling, measurement errors associated with variations in the flight times in the spikes can be eliminated. Equation (6) becomes:

$$\Delta t_m = t_m - (t_1 + t_2) = \frac{2h_m}{c} = t_{gm} \quad (7)$$

$$\Delta t_{ref} = t_{ref} - (t_1 + t_2) = \frac{2h_{ref}}{c} = t_{gr}$$

$$\frac{\Delta t_{ref}}{\Delta t_m} = \frac{h_{ref}}{h_m} \Rightarrow h_m = h_{ref} \frac{\Delta t_m}{\Delta t_{ref}}$$

Thus the absolute position can be measured independently of the speed c, and therefore independently of temperature, by calculating the ratio $\Delta t_m/\Delta t_{ref}$. The measurement is then no longer dependent on an accurate knowledge of $h_{ref}$, $\Delta t_{ref}$ and $\Delta t_m$. In practice, the time intervals $\Delta t_m$ and $\Delta t_{ref}$ are quantified using a high-frequency clock. Then $\Delta t_m = N_m T_{ck}$ and $\Delta t_{ref} = N_{ref} T_{ck}$ where $N_m$ and $N_{ref}$ are the results of the integer division of $\Delta t_m$ and $\Delta t_{ref}$ by the clock period $T_{ck}$. Given equation (4), it is easy to demonstrate that the number $N_{ref}$ obtained at temperature T—denotes $N_{ref}(T)$—can be related to the number $N_{ref}(T')$ obtained at temperature T' by the equation:

$$T = T \frac{N_{ref}^2(T')}{N_{ref}^2(T)}.$$

If the temperature T is known the temperature T' can be determined by measuring $N_{ref}(T')$.

FIG. 13 shows the wiring diagram of a step generator for periodically charging the emitter transducer X. The generator comprises two oscillators, an oscillator OSC1 which charges a reservoir capacitor C23 and an oscillator OSC2 which turns on a transistor via which the piezoelectric element X is excited. The inductor L1 and the diode D1 reduce the step rise time and increase its amplitude to a value close to twice the value obtained with the voltage booster stage ETN. The voltage booster stage comprises diodes (D2 to D21) and capacitors (C3 to C22). It is driven by the output ST1 of the oscillator OSC1. The oscillators are connected to symmetrical supply voltages +Vcc and −Vcc. The frequency of the oscillator OSC1 is in the order of 1 MHz and that of OSC2 is in the order of 1 kHz. The capacitors C23, C24 and the transistor T1 must be able to withstand the high voltages generated by the stage ETN.

If two read heads are conjugated at two points (E,R) and ($E_2,R_2$), as shown in FIG. 12, it is possible to measure the thickness e of an object with a resolution of one micrometer. The distance $h_0$ between the two read heads must be calibrated and stored in memory. It is deduced either from the measured flight time of a packet of waves from the emitter transducer of head 1 detected by the receiver transducer of head 2 when the sample whose thickness e is to be determined has not yet been placed between the heads or in the presence of a sample of known thickness e, deduced from the measured distances $h_{m1}$ and $h_{m2}$ relative to the two faces of the reference sample. Then: $h_0 = e + h_{m1} + h_{m2}$. A sample of unknown thickness is then placed between the heads and the distances $h_{m1}$, $h_{m2}$ between the faces of the sample and the read heads are measured. The thickness e of the object is obtained from the equation:

$$e = h_0 - h_{m1} - h_{m2}$$

In the case of measuring a position, a two-stage method may be used to boost the level of the signal corresponding to indirect coupling. During the first stage there is no sample and the signals registered by one head are stored in a memory to be subtracted in a second stage from signals obtained in the presence of a sample. The distance $h_0$ between two read heads must be slightly greater than the reference distances $h_{ref1}$ and $h_{ref2}$ to prevent mutual coupling between the heads disturbing their measurement window (defined for each head by the direct coupling signal and the echo from the associated reference surface).

A differential measurement technique consists in sampling the analog signals, for example quantizing their amplitude on eight bits, and saving them in memory for subsequent digital processing. To limit the amount of data saved, sampling of the analog signals can be restricted to a measurement window of around 80 μs maximum for a point to reference surface distance in air of 10 mm. For a sampling frequency of 100 points per microsecond, the maximum memory capacity for each head is 7.6 kbytes, corresponding to a temperature range from −100° C. to +250° C. The temperature resolution of the device in a pulse mode is 0.1° C. The resolution of the device for a position measurement is 1.7 µm at 0° C.

FIG. 14 is the block diagram of a device in accordance with the invention providing a position detector with a resolution of one micrometer and requiring no temperature correction, employing a read head with two spikes. The distance $h_m$ between the read head and the surface of the sample is measured by exciting the emitter transducer of the emitter spike 2 by means of the step generator 1. This generates a packet of waves that are reflected at the sample 16 and detected by the transducer of the receiver spike 3. The two spikes are oriented for minimum direct coupling. The detected signal is then amplified by an amplifier 4 and if necessary formatted before it is squared by a squaring circuit 5 and integrated twice by active integrators 61 and 62. The signal returned by the transducer of the receiver spike contains a first packet of waves D due to residual direct coupling between the spikes and another packet of waves I due to indirect coupling between the two spikes and the probed surface, delayed by a time $\Delta t_m$ proportional to $h_m$. To determine the flight time $\Delta t_m$ quantitatively, the packets of waves D and I are isolated by means of monostables 71 and 72 which are triggered on a rising edge, a monostable 73 triggered on a falling edge and an AND gate 81. This produces the signals S1 whose rising edge corresponds to the arrival of the packet of waves D and S2 whose rising edge corresponds to the arrival of the packet of waves I. The flight time $\Delta t_m$ is obtained by applying the AND operator 83 to the signal S1 and the signal from the monostable 74 triggered on a rising edge by the signal S2. An 80 MHz clock 9 quantizes the duration $\Delta t_m$ as an integer number $N_{bcd}$ equal to the integer division of $\Delta t_m$ by the clock period. The number $N_{bcd}$ is counted by BCD counters 101, 102, 103, 104. A monostable 75 is triggered on a falling edge of the signal from the AND gate 83 to reset (RAZ) the counters after an additional time-relay set by the monostable 76 and to produce a bit which, when low, indicates the availability of data $\overline{AffEn}=\overline{cs}$. A parallel interface 11 using an Intel 8255 programmable peripheral interface adapter transmits to a microcomputer the binary word consisting of the number $N_{bcd}$ and the bit $\overline{AffEn}=\overline{cs}$. Direct display of the data is also possible using a multiplexed four-digit LCD 13. Each of the four digits is addressed via the address bits a1 and a2 controlling a decoder 15 which controls the tristate drivers 121, 122, 123, 124. The address bits a1 and a2 are incremented via a CD4060 counter oscillator triggered via the AND gate 82 by a high level of the data presence bit AffEn.

What is claimed is:

1. An acoustic detector device characterized in that it includes at least one emitter unit including a solid tapered profile spike (C) associated with means (X) for exciting said spike to propagate ultrasound waves in an antisymmetrical propagation mode in said spike and to emit said waves into a surrounding gas and at least one receive unit including a tapered profile solid spike associated with detector means for receiving said ultrasound waves.

2. A device according to claim 1 characterized in that the excitation means and the detector means comprise a respective piezoelectric element (X) in a compartment (Cpt), said spike and said compartment being machined in a single piece.

3. A device according to claim 1 or claim 2 characterized in that the (or each) solid spike is made of a solid elastic material and has a conical profile.

4. A device according to claim 1 characterized in that it includes an emitter unit and a separate receiver unit and the tapered spikes of the two units are disposed in two essentially opposite directions, the ends of said spikes facing each other at their apex over an axial coupling length l equal to the wavelength of the ultrasound waves and being separated from each other by a constant distance d over all of the coupling length so that the direction of the vibrations and the direction of maximum sensitivity (SV) are parallel and maximum direct coupling is obtained between the two spikes.

5. A device according to claim 1 characterized in that it includes an emitter unit and a separate receiver unit, the tapered spikes of the two units are disposed in two essentially opposite directions, without overlapping, and the apexes of the two spikes are at equal distances from a surface whose position relative to the device must be determined so that the directions (SV) of the maximum emit and receive vibrations are parallel and maximum indirect coupling is obtained between the two spikes and said surface.

6. A device according to claim 1 characterized in that it further includes means for measuring the flight time of a packet of ultrasound waves propagating in the spike of the emitter unit toward a small surface (SS) of a sample (ECH) and reflected by that surface toward the spike of the receiver unit in order to determine the distance (hm) between said surface and said spikes.

7. A device according to claim 5 characterized in that it further includes means for measuring variations in amplitude and phase of the ultrasound waves received by the receiver unit after reflection at a surface, in a harmonic mode, to determine the distance (hm) between said spikes and said surface.

8. A device according to claim 1 characterized in that the end of the spike or of at least one of the spikes is polished to obtain a locally plane surface (EP) at that end so that the directionality diagram of the spike is finer and its sensitivity increased.

9. A device according to claim 6 characterized in that the flight time measuring means include a clock whose frequency is high relative to the center frequency of the emitted ultrasound wave.

10. A device according to claim 6 characterized in that it further includes means for determining a time at which waves resulting from direct coupling with the emitter unit are received by the receiver unit, this time being used as a time origin for calculating the flight time.

11. A device according to claim 6 characterized in that it further includes a reflective surface (SR) at a known distance ($h_{ref}$) from the spike of a common unit simultaneously forming the emitter unit and the receiver unit and on a side of said spike opposite that on which there is a sample surface whose distance from the spike is to be measured, and the distance (hm) between said sample surface and the spike is given by the equation:

$$hm=h_{ref}\Delta tm/\Delta t_{ref}$$

in which $\Delta tm$ is the flight time of waves reflected at the sample surface, and $\Delta t_{ref}$ is the flight time of waves reflected at the reference surface.

12. A device according to claim 11 characterized in that the reference surface (SR) is curved and has cylindrical or spherical symmetry and the axis or center of symmetry respectively intersects or is coincident with the axis of the spike.

13. A device according to claim 12 wherein the excitation means and the detector means comprise a respective piezoelectric element in a compartment, and the reference surface has cylindrical symmetry and comprises a portion of a tube of diameter D, the compartment of the transmit and receive unit has the same diameter D and said tube is fixed to said compartment.

14. A device according to claim 5 characterized in that the axes of the spikes of the emitter and receiver units define an angle $\alpha$ between them which satisfies the following condition throughout the range of working temperatures:

$$\alpha > 2 \arcsin (c_{gas}/c_{cone})$$

where $C_{gas}$ designates the speed of the waves in the gas, and $C_{cone}$ designates the speed of the waves in the spikes.

15. A device according to claim 1 for contactless measurement of the thickness (e) of a sample, characterized in that it comprises two measuring heads each including an emitter unit and a receiver unit spaced by a distance (h0) and between which said sample can be placed, in that it includes means for determining said distance ($h_0$) between the two heads by measuring the flight time of a packet of waves propagating from one head to the other in the absence of the sample or by measuring the round trip flight time of two packets of waves propagating between each of the two heads and the corresponding face of a reference sample of known thickness, and for determining the distance ($h_{m1}, h_{m2}$) between each of the two heads and the corresponding face of the sample to be measured by measuring the round trip flight time of a packet of waves propagating between each head and said corresponding face of the sample to be measured, the thickness of which is calculated from the equation:

$$e = h_0 - h_{m1} - h_{m2}.$$

16. A device according to claim 10 for measuring the relative temperature of a gas, characterized in that said sample surface constitutes a reflective reference surface (SR) at a known distance ($h_{ref}$) from the spike of a common unit forming an emitter unit and a receiver unit at the same time, in that the device further includes means for determining the number of clock periods (N(T')) corresponding to the round trip flight time between the end of the spike of the emitter and receiver unit and the reference circuit (SR) of a packet of waves propagating in the gas at a known temperature (T') and for determining the number of clock periods (N(T)) corresponding to the round trip flight time over the same path of a packet of waves propagating in the bas at the temperature (T) to be measured, and the temperature to be measured is given by the equation:

$$T = T'(N(T')^2/N(T)^2).$$

17. A device according to claim 1 characterized in that it further includes sampling and analog/digital converter means for processing the signal delivered by the receiver unit, memories for storing the digitized data and a digital signal processor unit for establishing the difference between signals delivered in two different situations.

18. A device according to claim 7 for profile measurement characterized in that it includes means for disturbing the coupling field between the spikes of the emitter and receiver unit and the scanned surface, said means including a screen (Ecr) whose position is modulated at a frequency ($f_1$) different from the frequency ($f_0$) of excitation of the antisymmetric mode in the spike of the emitter unit (E), said modulation causing amplitude and phase modulation of the excitation signal of the antisymmetric mode in the spike of the receiver unit (R), and the device further includes a synchronous detection amplifier whose reference frequency is the frequency ($f_1$) of modulation of the position of the screen.

19. A device according to claim 18 characterized in that the screen (Ecr) is a plate to the end of which is fixed a razor blade shaped member disposed vertically between the two spikes, said plate being caused to resonate mechanically in the longitudinal direction by a piezoelectric transducer (PZT) and at the frequency ($f_1$) at which the position is modulated.

* * * * *

UNITED STATES PATENT AND TRADEMARK OFFICE
CERTIFICATE OF CORRECTION

PATENT NO.   : 6,269,700 B1
DATED        : August 7, 2001
INVENTOR(S)  : Jean-Pierre Nikolovski Page 1 of 1

It is certified that error appears in the above-identified patent and that said Letters Patent is hereby corrected as shown below:

Title page,
Add in item [73]: -- Jacques Lewiner (part interest), Paris, France --.

Column 7,
Line 65, delete "$\Delta t_m/\Delta_{ref}$" and insert -- $\Delta t_m/\Delta t_{ref}$ --.

Column 10,
Line 56, delete "hm=$h_{ref}$ $\Delta$tm/$\Delta t_{ref}$" and insert -- hm=$h_{ref}$.$\Delta$tm/$\Delta t_{ref}$ --.

Column 11,
Line 14, delete "arc sin" and insert -- arcsin --.

Column 12,
Line 9, delete "bas" and insert -- gas --.

Signed and Sealed this

Twenty-eighth Day of May, 2002

*Attest:*

*Attesting Officer*

JAMES E. ROGAN
*Director of the United States Patent and Trademark Office*